US008571068B2

(12) United States Patent
Fourcand

(10) Patent No.: US 8,571,068 B2
(45) Date of Patent: Oct. 29, 2013

(54) NETWORK TIMING DISTRIBUTION AND SYNCHRONIZATION USING VIRTUAL NETWORK DELAYS

(75) Inventor: Serge Francois Fourcand, Fairview, TX (US)

(73) Assignee: Futurewei Technologies, Inc., Plano, TX (US)

(*) Notice: Subject to any disclaimer, the term of this patent is extended or adjusted under 35 U.S.C. 154(b) by 282 days.

(21) Appl. No.: 12/902,457

(22) Filed: Oct. 12, 2010

(65) Prior Publication Data

US 2011/0164625 A1 Jul. 7, 2011

Related U.S. Application Data

(60) Provisional application No. 61/292,433, filed on Jan. 5, 2010.

(51) Int. Cl.
*H04J 3/00* (2006.01)
(52) U.S. Cl.
USPC .......................................................... 370/498
(58) Field of Classification Search
None
See application file for complete search history.

(56) References Cited

U.S. PATENT DOCUMENTS

| 5,452,324 | A  | * | 9/1995  | Lewis et al. ................. | 375/373 |
| 6,044,122 | A  | * | 3/2000  | Ellersick et al. .............. | 375/360 |
| 6,654,345 | B1 | * | 11/2003 | Chiussi et al. ................ | 370/231 |
| 6,868,047 | B2 |   | 3/2005  | Sartschev et al.            |         |
| 2005/0271071 | A1 | * | 12/2005 | Madhavapeddi et al. ..... | 370/412 |
| 2007/0268938 | A1 |   | 11/2007 | Dowd                        |         |

FOREIGN PATENT DOCUMENTS

| CN | 1618027 A    | 5/2005 |
| CN | 101271720 A  | 9/2008 |
| CN | 101449520 A  | 6/2009 |

OTHER PUBLICATIONS

Foreign Communication From A Related Counterpart Application, PCT Application PCT/CN2010/079165, International Search Report dated Mar. 17, 2011, 4 pages.
Foreign Communication From A Related Counterpart Application, PCT Application PCT/CN2010/079165, Written Opinion dated Mar. 17, 2011, 7 pages.
"Transport of Accurate Time Synchronization Over Access Technologies," Study Group 15—Contribution 977, International Telecommunication Union—Telecommunication Standardization Section, COM 15-C977-E, May 2010.

(Continued)

*Primary Examiner* — Minh-Trang Nguyen
(74) *Attorney, Agent, or Firm* — Conley Rose, P.C.; Grant Rodolph; Rayhao Chung

(57) ABSTRACT

A network component comprising a source-delay locked loop (S-DLL), a source timestamp queue (S-Q) coupled to the S-DLL, and a switch fabric coupled to the S-Q such that the S-Q is positioned between the switch fabric and the S-DLL, and wherein the S-DLL is configured to couple to an absolute timing component. Disclosed is a method comprising queuing a plurality of timestamps at a plurality of timestamp intervals from a source node, returning the received timestamps to the source node at the same timestamp intervals, receiving a plurality of offsets corresponding to the timestamps that are calculated using a virtual delay time for the timestamps from the source node, and aligning the queued timestamps to match the virtual delay time before processing additional timestamps to synchronize transmissions and establish frequency alignment with the source node.

19 Claims, 5 Drawing Sheets

(56) References Cited

OTHER PUBLICATIONS

Foreign Communication From A Counterpart Application, European Application No. 10841952.4, Extended European Search Report dated Sep. 19, 2012, 8 pages.

Montgomery, Warren A., "Techniques for Packet Voice Synchronization," IEEE Journal on Selected Areas in Communications, vol. SAC-1, No. 6, Dec. 1983, 7 pages.

Hass, Zygmunt, "Adaptive Admission Congestion Control," Computer Communications Review, No. 5, New York, Oct. 21, 1991, 19 pages.

Jiang, Wenjuan, et al., "Implementation of an Internet-Based Remote Controller With Guaranteed Exponential Stabilization," Proceedings of the 7th World Congress on Intelligent Control and Automation, Jun. 25-27, 2008, Chongqing, China, 6 pages.

* cited by examiner

NETWORK TIMING DISTRIBUTION AND SYNCHRONIZATION USING VIRTUAL NETWORK DELAYS

CROSS-REFERENCE TO RELATED APPLICATIONS

The present application claims priority to U.S. Provisional Patent Application No. 61/292,433, filed Jan. 5, 2010 by Serge Fourcand and entitled "Network Timing Distribution and Synchronization Using Virtual Network Delays," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet is the preferred protocol for many types of networks because it is flexible, decentralized, and scalable. Ethernet comprises a family of frame-based computer networking technologies for local area networks (LANs), and defines a number of wiring and signaling standards for the Physical Layer of the Open Systems Interconnection (OSI) networking model and a common addressing format and Media Access Control (MAC) at the Data Link Layer. Ethernet is flexible in that it allows variable-sized data packets to be transported across different types of mediums using various nodes each having different transmission speeds.

Synchronous Optical Networking (SONET)/Synchronous Digital Hierarchy (SDH) are standardized multiplexing protocols that transfer multiple digital bit streams over optical fibers or electrical interfaces. Due to SONET/SDH protocol neutrality and transport-oriented features, SONET/SDH is used for transporting substantially large amounts of telephone calls and data traffic over the same fiber or wire without synchronization problems. SONET/SDH network transmission standards are based on time-division multiplexing (TDM). TDM is a technology where two or more signals or bit streams are apparently transferred simultaneously as sub-channels in one communication channel but physically take turns on the channel. This is achieved by dividing the time domain into a plurality of recurrent timeslots, e.g. of about same length, one for each sub-channel. As such, one TDM frame corresponds to one timeslot per sub-channel. In networks that use SONET/SDH and/or TDM, such as some Ethernet networks, the nodes synchronize their transmissions by exchanging a plurality of time references or time stamps.

SUMMARY

In one aspect, the disclosure includes a network component comprising a source-delay locked loop (S-DLL), a source timestamp queue (S-Q) coupled to the S-DLL, and a switch fabric coupled to the S-Q such that the S-Q is positioned between the switch fabric and the S-DLL, and wherein the S-DLL is configured to couple to an absolute timing component.

In another aspect, the disclosure includes a network component comprising a S-DLL unit configured to send a plurality of timestamps at a plurality of timestamp intervals to a destination node, and a source queue configured to queue the timestamps returned from the destination node at the same timestamp intervals, wherein the S-DLL unit is further configured to process the queued timestamps to calculate a plurality of offsets corresponding to the timestamps based on a virtual delay time for the timestamps to the destination node and send the offsets to the destination node.

In a third aspect, the disclosure includes a method comprising queuing a plurality of timestamps at a plurality of timestamp intervals from a source node, returning the received timestamps to the source node at the same timestamp intervals, receiving a plurality of offsets corresponding to the timestamps that are calculated using a virtual delay time for the timestamps from the source node, and aligning the queued timestamps to match the virtual delay time before processing additional timestamps to synchronize transmissions and establish frequency alignment with the source node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are systems and methods for synchronizing transmissions between network nodes, such as Ethernet nodes. To synchronize their transmissions, a source node and a destination node may exchange and queue a plurality of timestamps that indicate a virtual delay time between the two nodes. The virtual delay time may correspond to a maximum expected half round-trip delay between the two nodes. The source node may send the timestamps to the destination node, which may queue and return the timestamps without processing the timestamps. The sent timestamps may indicate the actual reception time at the destination node. The source node may receive and queue the returned timestamps. The source node may process the queued timestamps to account for any offsets between the expected reception time at the destination node according to the virtual delay time and the actual reception time indicated by the destination node. The offsets may then be used by the destination node to accurately align and process the queued timestamps to match the virtual delay time to the actual half round-trip delay of the timestamps. Since the virtual delay time exceeds any expected transport delay between the two nodes, this timestamp forwarding scheme may account for any actual transport delays between the nodes and guarantee substantially equal half round-trip delays between the two nodes.

Figure 1:
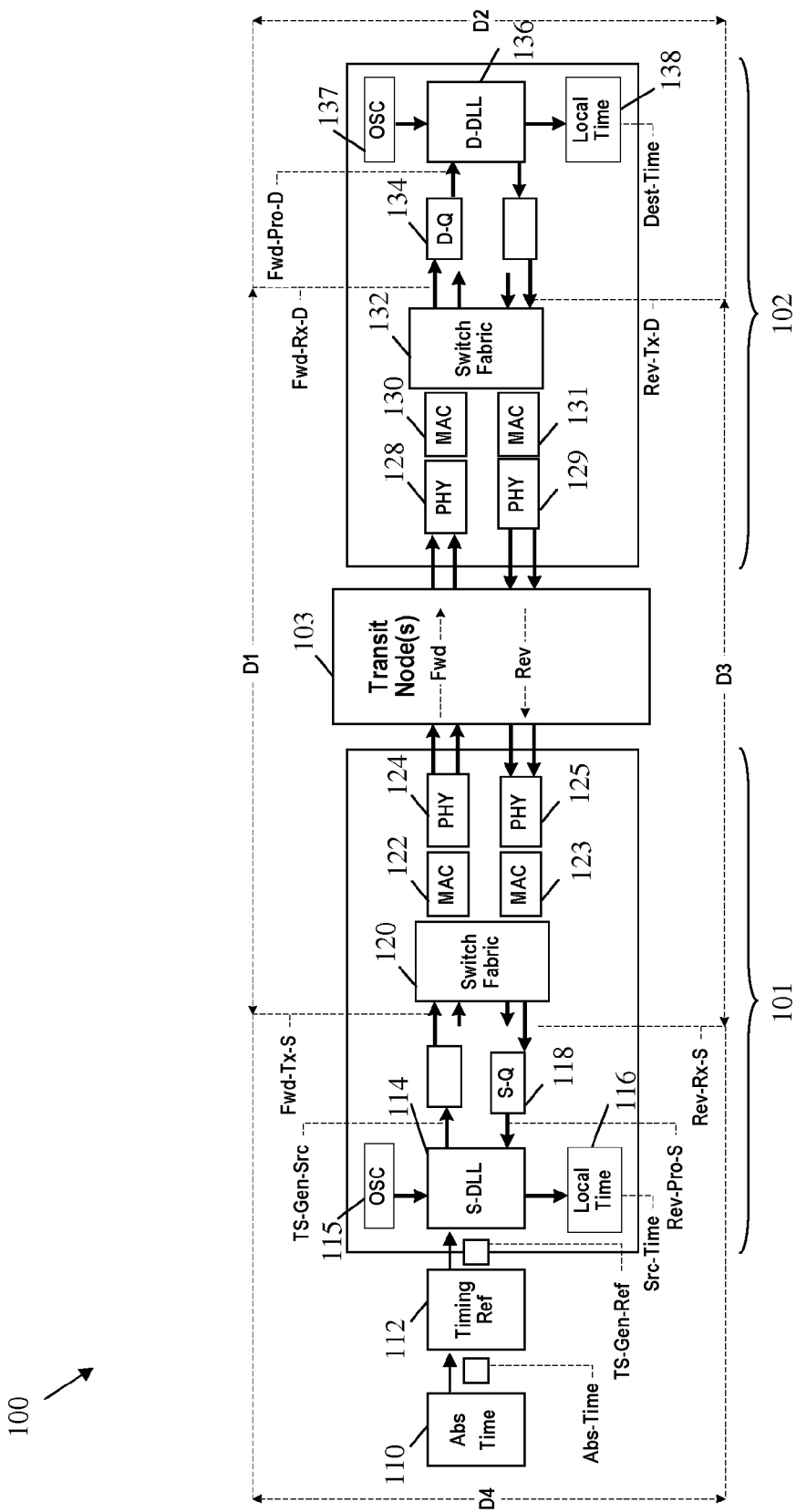
FIG. 1 is a schematic diagram of an embodiment of a timestamp forwarding system.

FIG. 1 illustrates an embodiment of a timestamp forwarding system 100, which may improve transmissions synchronization between network nodes. For example, the timestamp forwarding system 100 may be implemented in Ethernet networks, TDM based networks, LANs, Passive Optical Networks (PONs), Digital Subscriber Line (DSL) systems, or any networks that use clocks/timing references to synchronize transmissions. The timestamp forwarding system 100 may comprise a source node 101, a destination node 102, and optionally at least one transit node 103 positioned between the source node 101 and the destination node 102. The timestamp forwarding system 100 may also comprise an absolute timing unit 110 and a timing reference unit 112 that may be coupled to the source node 101 or located at any other component(s) or node(s) in the network.

The source node 101, the destination node 102, and the transit node 103 may be any devices, components, or apparatuses that are configured to transfer packets or frames, e.g. Ethernet or Internet Protocol (IP) packets, in a network. For example, the source node 101, the destination node 102, and the transit node 103 may include bridges, switches, routers, or various combinations of such devices. The nodes may comprise a plurality of ingress ports or units for receiving packets from other nodes, logic circuitry to determine which nodes to send the packets to, and a plurality of egress ports or units for transmitting frames to the other packets.

The source node 101 may comprise a S-DLL unit 114, a first oscillation (OSC) circuit 115, a first local time unit 116, a S-Q 118, a first switch fabric 120, a first forwarding MAC unit 122, a first receiving MAC unit 123, a first transmitting physical layer (PHY) unit 124, and a first receiving PHY unit 125. The destination node 102 may comprise a second receiving PHY unit 128, a second receiving MAC unit 130, a second forwarding MAC unit 131, a second forwarding PHY unit 129, a second switch fabric 132, a destination queue (D-Q) 134, a destination-delay locked loop (D-DLL) unit 136, a second OSC circuit 137, and a second local time unit 138. The components of the source node 101 and the destination node 102 may be arranged as shown in FIG. 1 and may be implemented using hardware, software, or both.

The S-DLL unit 114 may be configured to receive a timing reference, e.g. in a packet. The timing reference may be sent by the timing reference unit 112 based on an absolute time (Abs-Time), which may be provided by the absolute timing unit 110, such as a network clock. A plurality of timing references may be generated, e.g. periodically, at a plurality of subsequent time intervals equal to an absolute interval (Abs-Int), for example equal to about 125 microseconds. The S-DLL unit 114 may receive each timing reference in an Abs-Int and use the timing reference to update a local time in the first local time unit 116, which may be the source node's local clock. The S-DLL unit 114 may use an oscillation signal from the first OSC circuit 115 to update the local time at the correct time intervals. For example, The S-DLL unit 114 may receive the timing reference from the timing reference unit 112 at a timestamp generation reference (TS-Gen-Ref) time subsequent to the Abs-Time, and the first local timing unit 116 may update the local time at a source time (Src-Time) subsequent to the TS-Gen-Ref time.

The S-DLL may use at least one timing reference received in an Abs-Int to generate at least one timestamp in a corresponding timestamp interval (TS-Int). As such, the TS-Int may have a minimum resolution of one Abs-Int, e.g. include at least one Abs-Int. Alternatively, the TS-Int may comprise an integer number of Abs-Int. Each timestamp may comprise a local time indicated by the local time unit 116. As such, the S-DLL unit 114 may generate and transmit a plurality of timestamps in sequence over a plurality of subsequent time intervals TS-Int. For instance, the S-DLL unit 114 may send X timestamps (X is an integer) in a plurality of corresponding X packets over the X TS-Ints to the first switch fabric 120. The X timestamps may be sent to introduce a virtual delay time for the arrival of the timestamps at the destination node 102. The virtual delay time may be equal to the product of the time interval TS-Int for one timestamp and the quantity of forwarded timestamps X, e.g. XxTS-Int.

The quantity X may be estimated or derived from network parameters and/or network topology to account for a maximum expected half round-trip delay between the source node 101 and the destination node 102. Specifically, the quantity X may be determined to introduce a virtual delay time that exceeds any expected half round-trip delay between the source node 101 and the destination node 102. Thus, the virtual delay time may determine the forward trip delay time D1 from the source node 101 to the destination node 102. The expected half round-trip delay may comprise any of a plurality of delay sources. For example, the delays may include digitization delays, internal (node) transport delays, packet contention delays from other internal traffic sources, and/or source node switch delays. The delays may also include source MAC delays (for propagation and/or store-and-forward), source PHY delays (for propagation and/or adjustment), span delays (both fixed and variable), transit node/network delays, destination PHY delays (for propagation and/or adjustment), destination MAC delays (for propagation and/or adjustment), and/or destination node switch delays, e.g. if the D-DLL unit 136 is located on egress.

In an embodiment, each of the X TS-Ints may be about equal to an even integer number of Abs-Ints, e.g. divisible by two, to provide substantially equal delays for the forward trip and the reverse trip between the source node 101 and the destination node 102. Further, each of the X forwarded timestamps may indicate an expected reception time at the destination node 102 that is based on the virtual delay time XxTS-Int. For example, the expected reception time may be about equal to the sum of a forward transmission from source (Fwd-Tx-S) time (from the S-DLL unit 114) for each timestamp and the virtual delay time XxTS-Int. The Fwd-Tx-S time for each timestamp may be obtained according to the local time in the first local timing unit 116.

The first switch fabric 120 may be configured to receive and switch different traffic types from the S-DLL unit 114 and forward the traffic. For example, the different traffic may correspond to different bit rates and/or encoding schemes. The first switch fabric 120 may forward the X timestamps, e.g. as packets or timing references (values), from the S-DLL 114 to the first forwarding MAC unit 122, which may encapsulate/encode the timestamps in MAC layer packets. The first forwarding PHY unit 124 may receive the MAC layer packets from the first forwarding MAC unit 122, encapsulate/encode the MAC layer packets in PHY layer packets, e.g. Ethernet packets, and send the packets to the transit node(s) 103. In turn, the transit node(s) 103 may forward the packets to the destination node 102. In other embodiments, the packets may be forwarded directly from the source node 101 to the destination node 102 without the transit node(s) 103.

At the destination node 102, the second receiving PHY unit 128 may decapsulate/decode the PHY layer packets to obtain the MAC layer packets and the second receiving MAC unit 130 may then decapsulate/decode the MAC layer packets to obtain the X timestamps. The X timestamps may then be forwarded to the second switch fabric 132, which may be configured substantially similar to the first switch fabric 120 and forward the X timestamps to the D-Q 134.

The D-Q 134 may receive each of the N timestamps at a TS-Int and queue each of the X timestamps. Thus, the size of the D-Q 134 may be determined to accommodate about X timestamps. Subsequently, each of the X timestamps may be forwarded from the D-Q 134 to the D-DLL unit 136. The D-DLL unit 136 may receive each timestamp, for example at a forward processing at destination (Fwd-Pro-D) time, and return the timestamp in the reverse direction at the same TS-Int without processing the timestamp. However, the D-DLL unit 136 may add the actual reception time, e.g. Fwd-Pro-D, to each timestamp before returning the timestamp. The actual reception time may be added to the timestamps according to a local time indicated by the second local time unit 138. The second switch fabric 132 may receive each returned timestamp, for example at a reverse transmission at destination (Rev-Tx-D) time, and forward the timestamp to the second forwarding PHY unit 129 via the second forwarding MAC unit 131. The difference between the Fwd-Rx-D time and the Rev-Ts-D time may be equal to D2. Subsequently, the timestamps may be returned to the source node 101 via the transit node(s) 103. Thus, the X timestamps may be received, queued, and returned each at a time and within a corresponding TS-Int.

The timestamps may be received in the source node 101 and forwarded via the first receiving PHY unit 125, the first receiving MAC unit 123, and the first switch fabric 120 to the S-Q 118. Each timestamp may be received in a corresponding TS-Int and queued in the S-Q 118. The size of the S-Q 118 may be determined to accommodate about X timestamps. For example, the S-Q 118 may receive each timestamp at a reverse reception at source (Rev-Rx-S) time. Since each of the X timestamps are forwarded and returned at substantially equal TS-Ints, the virtual delay time in the reverse trip, D3, may be equal to the virtual delay time in the forward trip D1, e.g. equal to about XxTS-Int. The virtual delay time D3 may be equal to the difference between the Rev-Rx-S time and the Rev-Tx-D time for each timestamp.

After the S-Q 118 receives and queues the X timestamps, the S-Q 118 may forward the queued timestamps to the S-DLL unit 114. The S-DLL unit 114 may process each of the timestamps in the S-Q 118 to obtain or calculate a corresponding round-trip delay time, e.g. the sum of D1, D2, and D3. For example, the total round-trip delay time may be equal to the difference between the Rev-Rx-S time and the Fwd-Tx-S. The S-DLL unit 114 may then calculate for each timestamp the difference or offset between the actual reception time indicated by the destination node 102 and the expected reception time based on the virtual delay time used. For example, the offset may be equal to the difference between the half round-trip obtained by the S-DLL unit 114 and the virtual delay time used. The offset may be positive if the actual reception time at the destination node 102 is greater than the expected reception time at the destination node 102 or may be negative if the actual reception time is less than the expected reception time. As such, the returned X timestamps may be received and queued each at a time and within a corresponding TS-Int, and subsequently the timestamps may be processed.

Since the virtual delay time may exceed any expected delays in both directions between the nodes, the offsets may substantially account for any transport delays between the nodes and internal delays in the destination node 102 and/or the source node 101. For example, the calculated offset may correspond to the difference or lag between the Fwd-Rx-D time and the Fwd-Pro-D time at the destination node 102. The offsets may also account to timestamp packet delay variations, out-of-order packet transmissions, duplicate packet transmissions, lost or damaged packets, or combinations thereof.

The source node 101 may then send the calculated offsets to the destination node 102, which may use the offsets to properly align or shift the X queued timestamps in the D-Q 134 before processing the timestamps in the D-DLL unit 136. The offsets may be sent to the destination node 102 each at a time and arrive to the destination node 102 within corresponding TS-Ints or may be sent jointly after processing the X timestamps at the source node 101. The destination node 102 may use each received offset to properly align a queued timestamp (in the D-Q 134) that corresponds to the offset. For example, a timestamp in the D-Q 134 may be shifted to a higher index proportional to the offset if the offset is negative or to a lower index proportional to the offset if the offset is positive. Shifting or properly aligning the timestamps in the D-Q 134 may guarantee receiving each timestamp substantially in the D-DLL 136 at the expected reception or arrival time according to the expected half round-trip delay that matched the virtual delay time. Thus, the properly aligned and queued timestamps may be processed each at a time and within a TS-Int by the D-DLL unit 136 to accurately update a local time in the second local time unit 138, e.g. according to the local time of the source node 101 indicated in the timestamps.

Each of the properly aligned X timestamps may be processed at the destination node 102 at about the virtual delay time from the local time at the source node 101, which may guarantee compensating for all possible delays between the two nodes. Additionally, each of the X timestamps may be processed at the same TS-Int used in the source node 101, which may improve the time synchronization between the two nodes. The D-DLL unit 136 may use an oscillation signal from the second OSC circuit 137 to update the local time at the correct time intervals, e.g. at each Abs-Int. Thus, the local time at the destination node 102 and the local time at the source node 101 may be both synchronized or matched with the Abs-Time.

The timestamp forwarding scheme above is implemented using a determined quantity of X timestamps between the source node 101 and the second node 102. As described, the quantity of X timestamps may introduce a substantially equal delay time for transporting packets in each of the forward direction and the reverse direction between the two nodes. Thus, this timestamp forwarding scheme may be suitable for networks with asymmetric data transport between a source node and a destination node, e.g. where the forward (or upstream) path may have a different bandwidth than the reverse (or downstream) path. For instance, the timestamp forwarding scheme may be implemented in a PON, where the downstream channel may have a larger bandwidth than an upstream channel. Accordingly, a virtual delay time, which may be greater than each of the downstream channel delay and the upstream channel delay, may be used to introduce a substantially equal delay time for the transported timestamps in both the downstream and upstream channels.

Additionally, queuing the X timestamps at the nodes may compensate for timestamp packet delay variation (PDV) between the nodes. The timestamp processing time, e.g. D2, in the destination node 102 may not be affected by the PDV since the introduced virtual delay time, XxTS-Int, may be greater than the maximum network packet delay in either direction between the nodes. The time XxTS-Int may also be determined to allow enough buffering in the D-Q 134 and/or the S-Q 118 to support the re-ordering of out-of-order timestamp packets and the handling of duplicate timestamp packets. The time XxTS-Int may also be set to allow enough buffering for accurate interpolation of missing data due to lost or damaged timestamp packets, e.g. by using timing data preceding and succeeding the missing timestamp data in the queue. The X timestamps may also be exchanged multiple times, such as over different periods of time, to repeat the timestamp forwarding scheme and thus maintain transmissions synchronization periodically or when needed.

Figure 2:
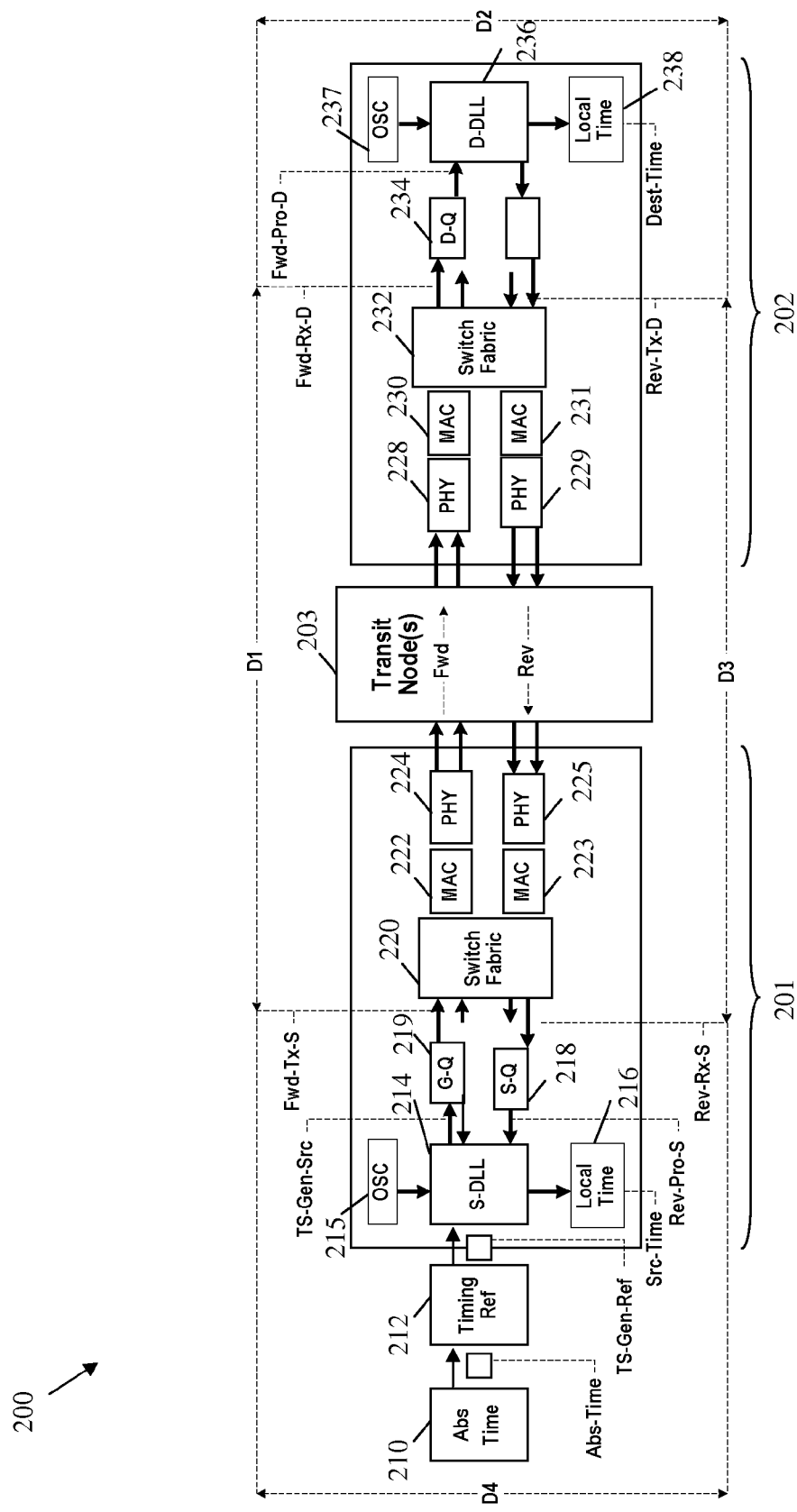
FIG. 2 is a schematic diagram of another embodiment of a timestamp forwarding system.

FIG. 2 illustrates another embodiment of a timestamp forwarding system 200. The timestamp forwarding system 200 may comprise a source node 201, a destination node 202, at least one transit node 203, an absolute timing unit 210, and a timing reference unit 212, which may be configured substantially similar to the corresponding components of the timestamp forwarding system 100. Accordingly, the source node 201 may comprise an S-DLL unit 214, a first OSC circuit 215, a first local time unit 216, an S-Q 218, a first switch fabric 220, a first forwarding MAC unit 222, a first receiving MAC unit 223, a first forwarding PHY unit 224, and a first receiving PHY unit 225. The destination node 202 may comprise a second receiving PHY unit 228, a second receiving MAC unit 230, a second forwarding MAC unit 231, a second forwarding PHY unit 229, a second switch fabric 232, a D-Q 234, a D-DLL unit 236, a second OSC circuit 237, and a second local time unit 238. The components of the source node 201 and the destination node 202 may be arranged substantially similar to the corresponding components of the timestamp forwarding system 100.

Additionally, the source node 201 may comprise a generation queue (G-Q) 219 that may be positioned between the S-DLL 214 and the first fabric switch 220. The G-Q 219 may receive each of the N timestamps at a corresponding TS-Int from the S-DLL unit 214 and queue each of the X timestamps. The G-Q 219 may forward the queued timestamp to the first switch fabric 220 each at a time within corresponding TS-Ints. For example, the G-Q 219 may receive and queue a timestamp at the TS-Gen-Src time and forward a queued timestamp at the Fwd-Tx-S time. The forwarded timestamp may then be transported to the destination node 202. When the S-DLL unit 214 processes the timestamps in the S-Q 218 to calculate the corresponding offsets, the S-DLL unit 214 may subsequently send the offsets to both the destination node 202 for processing (as described above) and the G-Q 219. Similar to the destination node 202, the offsets may be used at the G-Q 219 to properly align the queued timestamps. Properly aligning the queued timestamps at the source node 201 before sending each timestamp at a corresponding TS-Int to the destination node 202 may improve the alignment process of the queued timestamps at the destination node 202 (in the D-Q 234) to match the virtual delay time between the two nodes. Thus, this dual alignment scheme at the source node 201 and the destination node 202 may improve time synchronization between the two nodes.

In some embodiments, the destination node 102 or 202 may also be configured to act as a source node similar to the source node 101 or 201, and as such may comprise a S-Q similar to the S-Q 118 or 218, a G-Q similar to the G-Q 219, or both. Thus, the destination node 102 or 202 may use the timestamp forwarding scheme above to synchronize transmissions or time with a second destination node (not shown), which may be coupled to the destination node 102 or 202 directly or via transit nodes 103 or 203.

The timestamp forwarding schemes in the timestamp forwarding systems 100 and 200 may be used to achieve substantially accurate transmissions synchronization and frequency alignment between the nodes, for example without modifying the network topology and/or causing substantial traffic congestion. However, the accuracy of phase alignment between the two nodes may depend on the difference between the timestamp processing times at the source node (e.g. Rev-Pro-S time) and the timestamp processing time at the destination node (e.g. Fwd-Pro-D time). The uncertainty of the difference between the two times, and thus the uncertainty of the phase alignment, may be proportional to the timestamp generation and processing interval (e.g. TS-Int).

In an embodiment, the TS-Int may be set to a value from about 125 microseconds to about 10 milliseconds. Reducing the TS-Int may improve the accuracy of frequency/phase alignment between the nodes but increase the amount of timestamp traffic to introduce the same virtual delay as larger TS-Ints, and hence traffic congestion in the network. Alternatively, increasing the TS-Int may reduce the amount of timestamp traffic and traffic congestion, but decrease the accuracy of frequency/phase alignment. For instance, the TS-Int may be set to about one millisecond to achieve a compromise between frequency alignment accuracy and traffic congestion. In an embodiment, to improve the phase alignment accuracy, the timestamps may be initially sent from the source node in a burst mode using a first reduced timestamp value TS-Int', such as for a plurality of initial timestamps. Subsequently, additional timestamps may be sent at a working timestamp value TS-Int (e.g. at about one millisecond) that may be greater than TS-Int'. Transmitting the initial timestamps at TS-Int' may initially improve the phase alignment accuracy between the two nodes. Subsequently, switching the time interval to TS-Int may reduce traffic congestion without substantially reducing the established phase alignment accuracy. The sum of the TS-Ints for all the remaining timestamps or the joint sum of the TS-Ints' and the TS-Ints for all initial and remaining timestamps may determine the virtual delay time between the nodes.

For example, the timestamp packet size may be about 64 octets, the inter-packet gap (IPG) may be about 12 octets, and TS-Int' may comprise about 608 bits. Thus, TS-Int' may be equal to about 6.08 microseconds for a 100 Megahertz (M or MHz) Ethernet network, about 608 nanoseconds for a Gigabit Ethernet network, and about 60.8 nanoseconds for a 10 Gigabit (G) Ethernet network. Using the phase alignment scheme above, the phase may be aligned within a range of about +/− (TS-Int'/2). This may result in source node to destination node phase alignment within a range of about +/−3.04 microseconds for the 100 M Ethernet network, about +/−304 nanoseconds for the Gigabit Ethernet network, and about +/−30.4 nanoseconds for the 10 G Ethernet network.

In one scenario, the timestamp forwarding scheme may be implemented in a PON, such as a Gigabit PON (GPON), between an optical line terminal (OLT) and an optical network unit (ONU) coupled to the OLT via an optical fiber or an optical distribution network (ODN). The OLT and the ONU may comprise similar components of the source node 101 (or 201) and the destination node 102 (or 202), respectively. For instance, the OLT may receive and timestamp a plurality of precision timing protocol (PTP) packets and send the PTP packets to the ONU. The ONU may also send to the ONU a correction delay or difference between the arrival time of the PTP packets and a reference time of the system's clock. The ONU may then receive and timestamp the PTP packets, delay the PTP packets (in a queue) to introduce the virtual delay time, and then return the PTP packets to the ONU. In turn, the ONU may receive and queue the returned PTP packets, timestamp the PTP packets, and then send a second correction delay or difference between the arrival time of the returned PTP packets and a reference time of the system's clock.

In another scenario, the timestamp forwarding scheme may be implemented in a DSL system, such as a very high bit rate DSL, between a very high bit rate DSL (VDSL) transceiver unit at a central office (VTU-O) and a VDSL transceiver unit at a residential location (VTU-R) coupled to the VTU-O via a DSL. The VTU-O and the VTU-R may comprise similar components of the source node 101 (or 201) and the destination node 102 (or 202), respectively, may exchange, queue, and process a plurality of timestamps in a plurality of PTP packets substantially similar to the OLT and the ONU above.

In some embodiments, further frequency/phase alignment may be achieved by processing a plurality of time octets/bits, e.g. instead of timestamp packets. As such, the timestamp interval may be effectively reduced without increasing the quantity of timestamp packets and therefore without increasing traffic congestion. Other phase alignment schemes may be implemented based on the specific network architecture.

Figure 3:
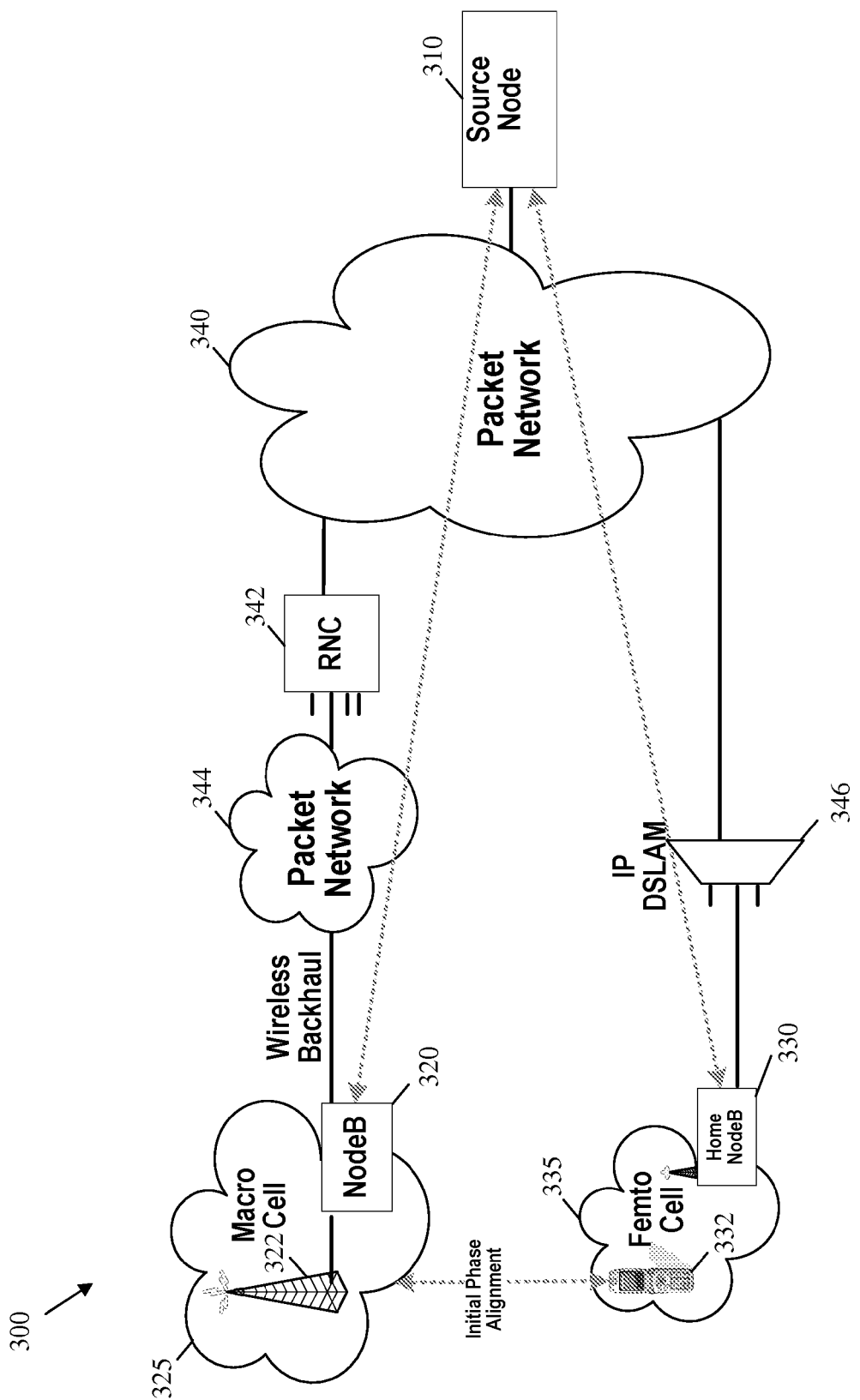
FIG. 3 is a schematic diagram of an embodiment of a network architecture.

FIG. 3 illustrates an embodiment of a network architecture 300 that may implement a phase alignment scheme. The network architecture 300 may comprise a source node 310, a first destination node 320 in a first wireless network 325, a second destination node 330 in a second wireless network 335, and a first packet based network 340 that couples the source node 310 to both the first destination node 320 and the second destination node 330. The network architecture 300 may also comprise a Radio Network Controller (RNC) 342 and a second packet based network 344 that couple the first destination node 320 to the source node 310, and a Digital Subscriber Line Access Multiplexer (DSLAM) 346 that couples the second destination node 330 to the source node 310. The different components in the network architecture 300 may be arranged as shown in FIG. 3.

The source node 310 may be configured similar to the source node 101 or 201 and the first destination node 320 and second destination node 330 may be configured similar to the destination node 102 or 202. Further, the first destination node 320 may be configured to connect a mobile device, e.g. mobile phone, to the first wireless network 325 via a base transceiver station (BTS) 322. For instance, the first destination node 320 may be a NodeB used in Universal Mobile Telecommunications System (UMTS) or Global System for Mobile (GSM) technologies and the first wireless network 325 may be a macro cell. The second destination node 330 may also be configured to connect a mobile device 332 to the second wireless network 335, e.g. via a radio antenna or tower. For instance, the second destination node 330 may be a home NodeB used in residential locations and the second wireless network 335 may be a femto cell or a wireless fidelity (Wi-Fi) network. The first packet based network 340 and second packet based network 344 may comprise any networks that transmit packets between the nodes, such as Ethernet or Internet Protocol (IP) packets. The RNC 342 may be any device, component, or apparatus that is configured to control the communication of NodeBs that are coupled it. The DSLAM 346 may be any device, component, or apparatus that is configured to connect multiple customer Digital Subscriber Lines (DSLs) to an Internet backbone line using multiplexing techniques. The DSLAM 346 may be an IP DSLAM that routes IP packets between the source node 310 and the second destination node 330.

Similar to the timestamp forwarding systems 100 and 200, the source node 310 may implement the timestamp forwarding scheme described above to achieve substantially accurate transmissions synchronization and frequency alignment with the first destination node 320 and similarly with the second destination node 330. Additionally, the source node 310 may initially send timestamps to each of the first destination node 320 and the second destination node 330 in a burst mode to achieve initial phase alignment with each of the destination nodes, as described above. Alternatively, the second wireless network 335 (e.g. femto cell) or the mobile device 332 may establish phase alignment with the first wireless network 325 (e.g. macro cell) via an air interface and by communicating with the first destination node 320 (or NodeB). The phase alignment between the destination nodes may be established, for instance using any phase alignment scheme supported by the first wireless network 325 and/or the second wireless network 335, after implementing the timestamp forwarding scheme between both destination nodes 320, 330 and the source node 310.

Figure 4:
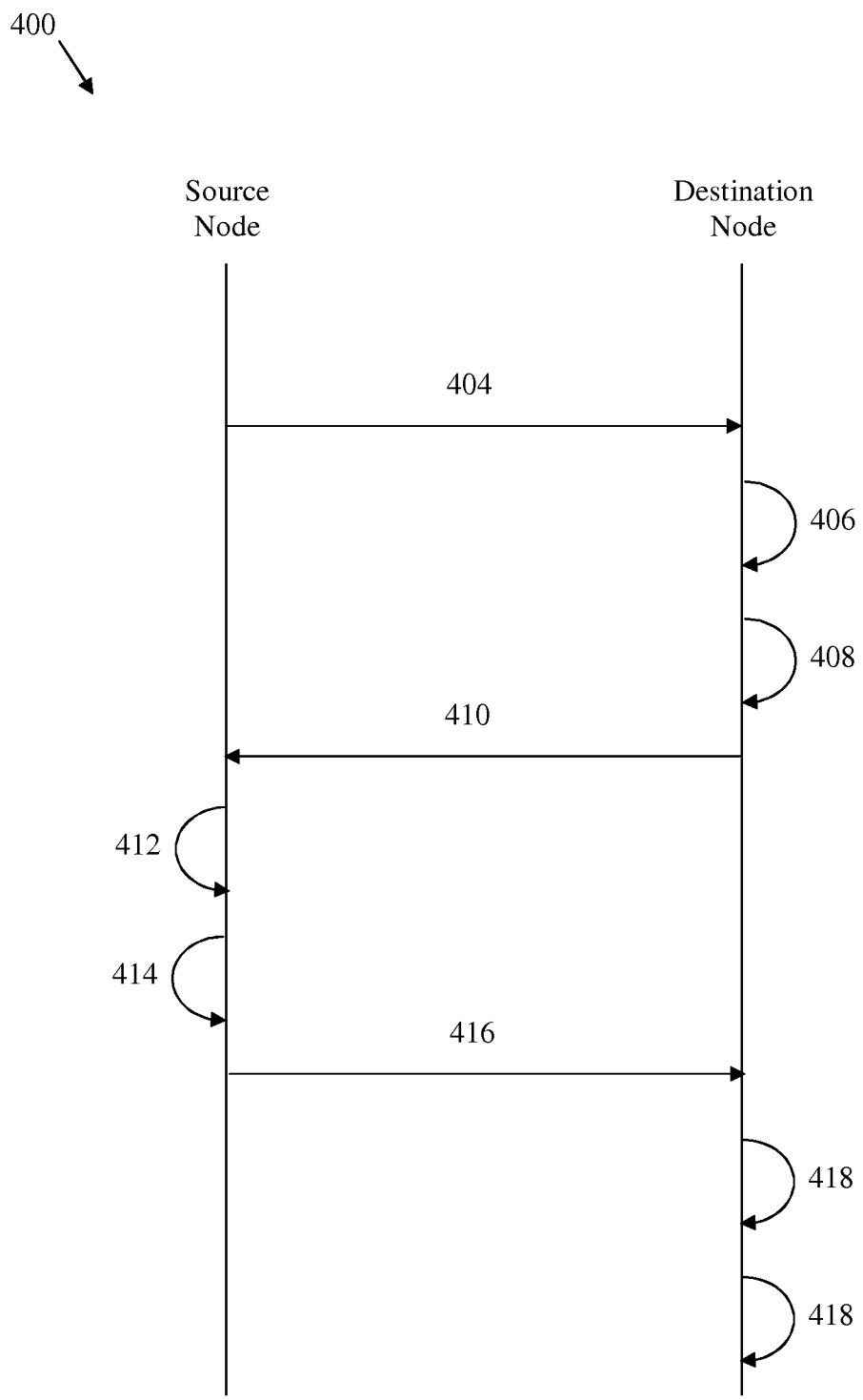
FIG. 4 is a protocol diagram of an embodiment of a timestamp forwarding sequence.

FIG. 4 illustrates an embodiment of a timestamp forwarding sequence 400 that may be used in the timestamp forwarding systems 100 or 200 and the network architecture 300. The timestamp forwarding sequence 400 may be implemented for a plurality of X timestamps exchanged between a source node and a destination node to account for any offsets in the timestamps received at the destination node with respect to a determined virtual delay time. At step 404, the source node may send each timestamp in a sequence of X timestamps to the destination node at one TS-Int in a sequence of X TS-Ints. Each timestamp may comprise a time reference that indicates a local time and/or absolute time at the source node. The source node may also add an expected reception or arrival time in each timestamp before sending the timestamp. The expected reception time may be equal to the local time and/or absolute time and a virtual delay time that is proportional to X and TS-Int At step 406, the destination node may receive the timestamps at the corresponding TS-Ints and queue the timestamps in the sequence they were received, e.g. in a queue for X timestamps. At step 408, after receiving and queuing the X timestamps, the destination node may add an actual reception or arrival time at the destination node to each received timestamp. At step 410, the destination node may return each timestamp in the queue in a corresponding TS-Int equal to the TS-Int of the received timestamps. Each returned timestamp may comprise the expected reception time inserted by the source node and the actual reception time added by the destination node.

At step 412, the source node may receive the returned timestamps in a corresponding sequence of X TS-Ints and queue the returned timestamps in the sequence they were received, e.g. in a queue of X timestamps. At step 414, after receiving the X times, the source node may process each timestamp in the queue. The X timestamps may be processed to calculate a plurality of offsets between the expected reception time and the actual reception time indicated in each of the timestamps. The offsets may be calculated based on a calculated round-trip delay for each timestamp and the virtual delay time used by the source node.

At step 416, the source node may send the calculated offsets for the X timestamps to the destination node. At step 418, the destination node may align each of the X timestamps properly in the queue based on a corresponding received offset to ensure that the delay time for each timestamp in the queue matches the virtual delay time. At step 420, the destination node may process the X queued and aligned timestamps to synchronize its local time with the source node local time and/or absolute time.

Figure 5:
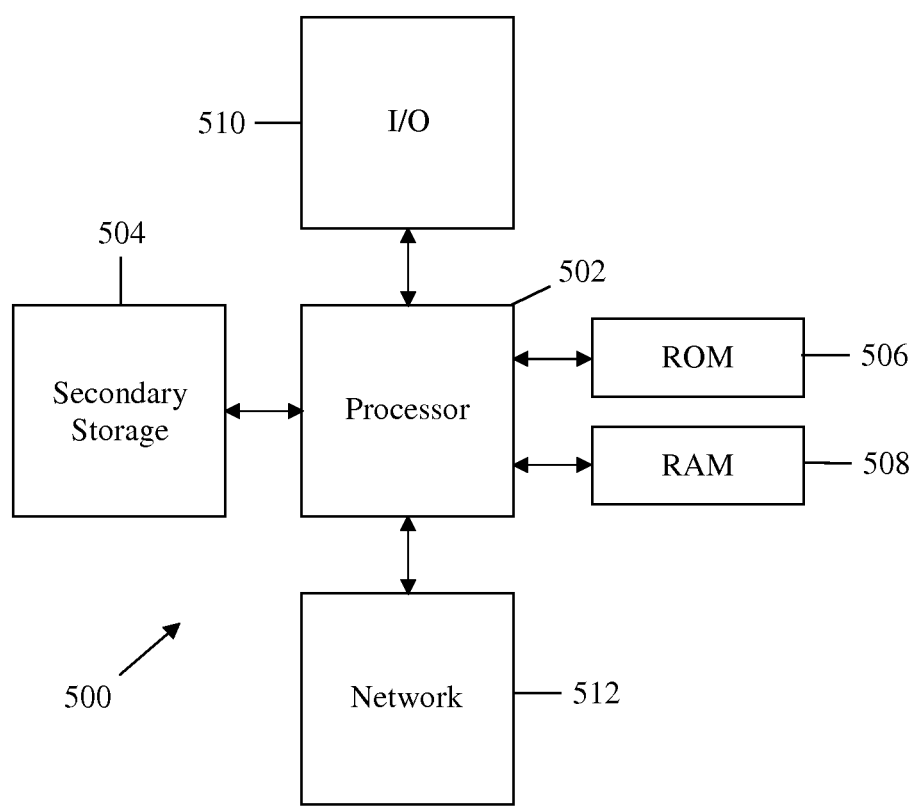
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   a source-delay locked loop (S-DLL);
   a source timestamp queue (S-Q) coupled to the S-DLL;
   a switch fabric coupled to the S-Q such that the S-Q is positioned between the switch fabric and the S-DLL;
   a generation timestamp queue (G-Q) coupled to the S-DLL and the switch fabric but not directly coupled to the S-Q;
   a receiving Media Access Control (MAC) component coupled to the switch fabric such that the switch fabric is positioned between the S-Q and the receiving MAC component;
   a receiving Physical (PHY) layer component coupled to the receiving MAC component such that the receiving MAC component is positioned between the receiving PHY layer component and the switch fabric;
   a forwarding MAC component coupled to the switch fabric such that the switch fabric is positioned between the S-Q and the receiving MAC component;
   a forwarding PHY layer component coupled to the forwarding MAC component such that the forwarding MAC component is positioned between the forwarding PHY layer component and the switch fabric;
   an oscillation (OSC) circuit coupled to the S-DLL component; and
   a local time component coupled to the S-DLL,
   wherein the S-DLL is configured to couple to an absolute timing component, and
   wherein the network component operates in the electrical domain.

2. The network component of claim 1, wherein the receiving PHY layer component and the forwarding PHY component are configured to couple to a destination node comprising:
- a destination queue (D-Q);
- a destination-delay locked loop (D-DLL) component coupled to the D-Q; and
- a second switch fabric coupled to the D-Q such that the D-Q is positioned between the second switch fabric and the D-DLL.

3. The network component of claim 2, wherein the destination node further comprises:
- a second receiving MAC component coupled to the second switch fabric such that the second switch fabric is positioned between the D-Q and the second receiving MAC component;
- a second receiving Physical (PHY) layer component coupled to the second receiving MAC component such that the second receiving MAC component is positioned between the second receiving PHY layer component and the second switch fabric;
- a second forwarding MAC component coupled to the second switch fabric such that the switch fabric is positioned between the D-Q and the second receiving MAC component;
- a second forwarding PHY layer component coupled to the second forwarding MAC component such that the second forwarding MAC component is positioned between the second forwarding PHY layer component and the second switch fabric;
- a second oscillation (OSC) circuit coupled to the D-DLL component; and
- a local timing component coupled to the D-DLL,
- wherein a clock for the network component and a clock for the destination node are not synchronized.

4. The network component of claim 2, wherein the S-DLL and the S-Q are located at an optical line terminal (OLT), wherein the D-DLL and the D-Q are located at an optical network unit (ONU), and wherein the timestamps are encapsulated in a plurality of precision timing protocol (PTP) packets.

5. The network component of claim 2, wherein the S-DLL and the S-Q are located in a very high bit rate DSL (VDSL) transceiver unit at a central office (VTU-O), wherein the D-DLL and the D-Q are located in a VDSL transceiver unit at a residential location (VTU-R), and wherein the timestamps are encapsulated in a plurality of precision timing protocol (PTP) packets.

6. The network component of claim 2, wherein the S-DLL and the D-DLL are coupled to each other via a forward path and a reverse path, and wherein the forward path has a greater bandwidth than the reverse path.

7. The network component of claim 1, wherein the S-DLL is configured to couple to a timing reference component such that the timing reference component is positioned between the S-DLL and the absolute timing component.

8. A network component comprising:
- a source-delay locked loop (S-DLL) unit configured to send a plurality of timestamps at a plurality of timestamp intervals to a destination node; and
- a source queue configured to queue the timestamps returned from the destination node at the same timestamp intervals;
- wherein the S-DLL unit is further configured to process the queued timestamps to calculate a plurality of offsets corresponding to the timestamps based on a virtual delay time for the timestamps to the destination node and send the offsets to the destination node.

9. The network component of claim 8, wherein the offsets are equal to a difference between the virtual delay time and a calculated half round-trip delay time for the timestamps.

10. The network component of claim 9 further comprising a generator queue configured to queue the timestamps before the timestamps are sent to the destination node, wherein the queued timestamps are aligned in the generator queue to compensate for the corresponding offsets and ensure that the virtual delay time is equal to the calculated half round-trip delay time for the timestamps.

11. The network component of claim 8, wherein the virtual delay time is equal to a product of one of the timestamp intervals and a quantity of the processed timestamps, and wherein the virtual delay time is greater than or equal to a maximum expected half round-trip delay time for sending the timestamps to the destination node.

12. The network component of claim 8, wherein each of the sent timestamps comprises a local time and an expected arrival time at the destination node that is equal to a sum of the local time and the virtual delay time, and wherein each of the returned timestamps comprises the expected arrival time and an actual arrival time at the destination node.

13. The network component of claim 12, wherein the local time is generated at an absolute time interval, and wherein the timestamp interval includes one or more absolute time intervals, and wherein the timestamps are not used to synchronize a clock for the network component with a clock for the destination node.

14. The network component of claim 13, wherein the timestamp interval includes an even quantity of absolute time intervals.

15. The network component of claim 8, wherein the transmission unit is further configured to send a plurality of initial timestamps at a plurality of reduce timestamp intervals in a burst transmission mode before transmitting the timestamps to support phase alignment with the destination node.

16. A method comprising:
- queuing a plurality of timestamps at a plurality of timestamp intervals from a source node;
- returning the received timestamps to the source node at the same timestamp intervals;
- receiving a plurality of offsets corresponding to the timestamps that are calculated using a virtual delay time for the timestamps from the source node; and
- aligning the queued timestamps to match the virtual delay time before processing additional timestamps to synchronize transmissions and establish frequency alignment with the source node.

17. The method of claim 16 further comprising reducing the timestamp intervals and increasing the quantity of timestamp packets, thereby improving a phase alignment with the source node without changing the virtual delay time.

18. The method of claim 16 further comprising increasing the timestamp intervals and reducing the quantity of timestamp packets, thereby reducing traffic without changing the virtual delay time, wherein the timestamps are not used to synchronize a clock from the source node.

19. The method of claim 16, wherein the timestamps are transmitted in a plurality of octets in at least one packet to increase the quantity of timestamps, reduce the quantity of timestamp packets, or both and improve phase alignment with the source node.

* * * * *

UNITED STATES PATENT AND TRADEMARK OFFICE
CERTIFICATE OF CORRECTION

PATENT NO. : 8,571,068 B2
APPLICATION NO. : 12/902457
DATED : October 29, 2013
INVENTOR(S) : Serge Francois Fourcand Page 1 of 1

It is certified that error appears in the above-identified patent and that said Letters Patent is hereby corrected as shown below:

In the Claims:

Column 13, Line 43 should read: "and the S-Q are located in a very high bit rate digital subscriber line (DSL) (VDSL)"

Signed and Sealed this
Seventeenth Day of December, 2013

Margaret A. Focarino
*Commissioner for Patents of the United States Patent and Trademark Office*